US011852866B2

(12) United States Patent
Iwai et al.

(10) Patent No.: US 11,852,866 B2
(45) Date of Patent: Dec. 26, 2023

(54) WAVEGUIDE MEMBER AND WAVEGUIDE LAYERED PRODUCT

(71) Applicant: FUJITSU INTERCONNECT TECHNOLOGIES LIMITED, Nagano (JP)

(72) Inventors: Toshiki Iwai, Kawasaki (JP); Taiji Sakai, Kawasaki (JP)

(73) Assignee: FICT LIMITED, Nagano (JP)

( * ) Notice: Subject to any disclaimer, the term of this patent is extended or adjusted under 35 U.S.C. 154(b) by 223 days.

(21) Appl. No.: 17/424,284

(22) PCT Filed: May 1, 2020

(86) PCT No.: PCT/JP2020/018384
§ 371 (c)(1),
(2) Date: Jul. 20, 2021

(87) PCT Pub. No.: WO2020/235333
PCT Pub. Date: Nov. 26, 2020

(65) Prior Publication Data
US 2022/0066098 A1 Mar. 3, 2022

(30) Foreign Application Priority Data
May 23, 2019 (JP) .................. 2019-096845

(51) Int. Cl.
*G02B 6/122* (2006.01)
(52) U.S. Cl.
CPC ................. *G02B 6/1221* (2013.01)

(58) Field of Classification Search
None
See application file for complete search history.

(56) References Cited

U.S. PATENT DOCUMENTS

| 2012/0219249 A1* | 8/2012 | Pitwon | G02B 6/138 |
| | | | 427/163.2 |
| 2015/0277032 A1* | 10/2015 | Hayashi | G02B 6/44 |
| | | | 385/126 |

FOREIGN PATENT DOCUMENTS

| JP | 2-90109 A | 3/1990 |
| JP | 4-238305 A | 8/1992 |
| JP | 2000-28837 A | 1/2000 |
| JP | 2000-180648 A | 6/2000 |
| JP | 2005-140822 A | 6/2005 |

(Continued)

OTHER PUBLICATIONS

International Search Report dated Aug. 4, 2020, issued in counterpart International Application No. PCT/JP2020/018384. (2 pages).

*Primary Examiner* — Chad H Smith
(74) *Attorney, Agent, or Firm* — WHDA, LLP

(57) ABSTRACT

An issue is directed to suppressing light interference occurring between a plurality of waveguides and providing waveguides at high densities. Means for solving the issue includes a plurality of cores (104) each configured to allow light to be transmitted therethrough, a clad (106) surrounding the plurality of cores (104) and smaller in refractive index for light than each of the cores (104), and a transmission suppression member (108) located between mutually adjacent two cores out of the plurality of cores (104) and configured to suppress transmission of light leaking from each of the cores.

3 Claims, 12 Drawing Sheets

(56) References Cited

FOREIGN PATENT DOCUMENTS

| JP | 2017-167392 A | 9/2017 |
|----|---------------|--------|
| WO | 99/46619 A1   | 9/1999 |

* cited by examiner

WAVEGUIDE MEMBER AND WAVEGUIDE LAYERED PRODUCT

TECHNICAL FIELD

The technique which the present application discloses relates to a waveguide member and a waveguide layered product.

BACKGROUND ART

There is a light waveguide element formed by using mainly an inorganic material, such as quartz glass or Ti diffusion $LiNbO_3$, or an organic material, such as polyimide, on a substrate made from, for example, quartz glass, Si, InP, or $Al_2O_3$.

Moreover, there is a polymer-coated glass core light waveguide including a buffer layer provided on a silicon substrate, a core portion formed on the buffer layer, and a polymer clad layer provided around the core portion and formed from a polymer. The polymer-coated glass core light waveguide further includes a protecting quartz glass substrate provided on the clad layer.

Additionally, there is a light waveguide in which a core layer is formed on a recess-shaped core pattern of a lower clad layer and the lower clad layer and, after a portion of the core layer overflowing from the core pattern is removed, an upper clad layer is formed on the lower clad layer.

CITATION LIST

Patent Literature

PTL 1: JP-A-2000-180648
PTL 2: JP-A-4-238305
PTL 3: JP-A-2005-140822

SUMMARY OF INVENTION

Technical Problem

In a structure including a plurality of cores each serving as a light waveguide, it is difficult to completely eliminate leakage of light from each light waveguide. If light leaking from a light waveguide enters another light waveguide, light interference occurs. While, to suppress such light interference, it is conceivable to employ a structure formed by making an interval between a plurality of cores larger, if the interval of cores is made larger, it becomes difficult to provide cores at high densities.

A technique which the present application discloses is directed to, as one aspect thereof, suppressing light interference occurring between a plurality of waveguides and providing waveguides at high densities.

Solution to Problem

According to a technique which the present application discloses, a waveguide member includes a plurality of cores each configured to allow light to be transmitted therethrough, a clad surrounding the plurality of cores and smaller in refractive index for light than each of the cores, and a transmission suppression member located between mutually adjacent two cores out of the plurality of cores in the clad and configured to suppress transmission of light leaking from each of the cores.

Advantageous Effects of Invention

According to a technique which the present application discloses, it is possible to suppress light interference occurring between a plurality of waveguides and providing waveguides at high densities.

DESCRIPTION OF EMBODIMENTS

A waveguide member according to a first embodiment is described in detail with reference to the drawings.

Figure 1:
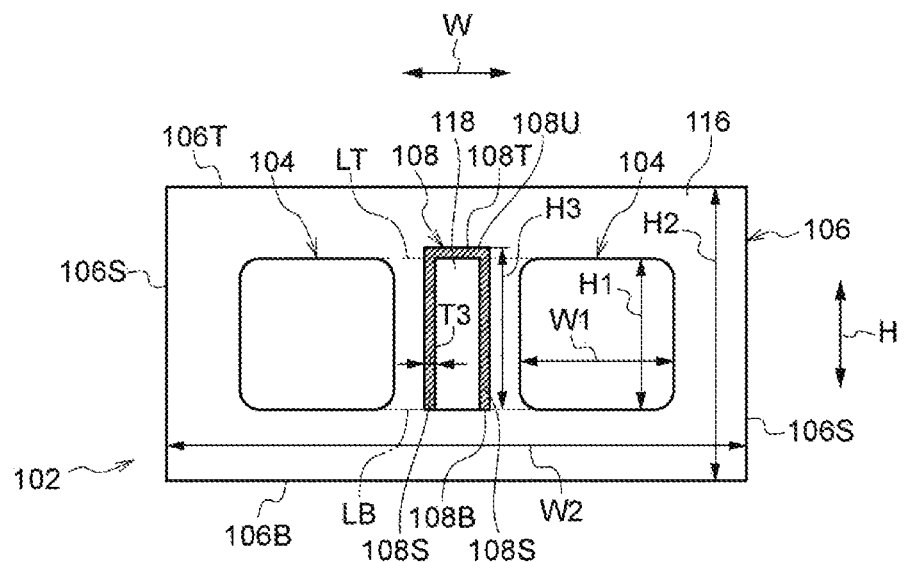
FIG. 1 is a sectional view illustrating, with a cross-section taken along a direction perpendicular to a longitudinal direction of each waveguide, a waveguide member according to a first embodiment.

FIG. 1 illustrates a waveguide member 102 according to the first embodiment. The height direction of the waveguide member 102 is indicated by arrow H and the width direction thereof is indicated by arrow W. However, such height direction and width direction are irrelevant to an actual usage state of the waveguide member 102, and an orientation of the waveguide member 102 being in a usage state is not specifically limited. The waveguide member 102 is used as a member through which to transmit light in a case where, for example, information communication is performed via light between a plurality of electronic apparatuses or electronic components.

The waveguide member 102 extends with a predetermined length with respect to a direction perpendicular to the height direction and the width direction.

The waveguide member 102 according to the first embodiment includes a plurality of cores 104. Each core 104 is formed in a long-length shape from a material through which light is transmitted. Each core 104 is a light waveguide through which light is internally transmitted, as will be described later. While, in the example illustrated in FIG. 1, there are two cores 104, a structure in which many more cores 104 are arranged in the width direction can be employed.

In the example illustrated in FIG. 1, the plurality of cores 104 is arranged with an interval between each other kept within a predetermined range (in the example illustrated in FIG. 1, in parallel with each other). Moreover, the plurality of cores 104 has the same length with respect to the longitudinal direction thereof (in FIG. 1, the depth direction of the drawing sheet surface), and the relative position thereof is maintained in such a way as to bring about no deviation in the longitudinal direction. Thus, the positions of respective ends in the longitudinal direction of the cores 104 coincide with each other, and the positions of respective opposite ends thereof also coincide with each other.

In the example illustrated in FIG. 1, in each of the cores 104, the cross-section shape in a direction perpendicular to the longitudinal direction is a square shape, in which a height H1 and a width W1 are equal to each other. While the cross-section shape of the core 104 is not limited to this and can be a rectangular shape, another polygonal shape, a circular shape, or an elliptical shape, the length of one side (each of the height H1 and the width W1) of the core 104 is set longer than or equal to the wavelength of light being transmitted.

As a material of the core 104, while, for example, light transmissive glass or resin can be used, in the present embodiment, the core 104 is made from glass.

A clad 106 is arranged around the core 104. The clad 106 integrally surrounds the plurality of cores 104, so that the relative positions of the plurality of cores 104 are maintained constant. The clad 106 has the same length as that of the core 104 with respect to the longitudinal direction of the core 104, and surrounds the plurality of cores 104 throughout.

In the example illustrated in FIG. 1, the clad 106 includes, a resin-made portion 116 made from a resin material having light permeability and a glass-made portion 118 made from glass. The cross-section shape of the resin-made portion 116 is a rectangle having a predetermined height H2 and width W2, and surrounds peripheries of two cores 104. Then, the glass-made portion 118 is arranged between the two cores 104 in a shape having a predetermined height and width. The depth of the glass-made portion 118 (the length in a direction perpendicular to the drawing sheet surface) is the same as the depth of the resin-made portion 116. Moreover, the glass-made portion 118 is not in contact with any core 104.

The refractive index of the resin-made portion 116 of the clad 106 is smaller than the refractive index of the core 104. Thus, a structure in which a member smaller in refractive index than the core 104 surrounds the periphery of the core 104 is employed. Therefore, light advancing inside the core 104 is totally reflected at a boundary between the core 104 and the clad 106.

A transmission suppression member 108 is embedded in the clad 106. The transmission suppression member 108 is made from a material which does not allow light to be transmitted therethrough (for example, a material which absorbs light or a material which reflects light), and is arranged between the plurality of (mutually adjacent two) cores 104.

In the example illustrated in FIG. 1, the transmission suppression member 108 is located at a middle portion between two cores 104, and is provided at a boundary between the resin-made portion 116 and the glass-made portion 118 of the clad 106. Specifically, the transmission suppression member 108 is in the form of a film or plate having a predetermined thickness T3, and includes an upper portion 108U provided on the upper surface of the glass-made portion 118 and side portions 108S provided on two side surfaces of the glass-made portion 118. In other words, in the example illustrated in FIG. 1, the cross-section shape of the transmission suppression member 108 is an approximately inversely u-shaped form which is closed at the upper portion 108U and is opened at the opposite side (the lower portion) thereof. However, as long as transmission of light is able to be suppressed between the two cores 104, a structure which lacks the upper portion 108U or a structure which includes the side portion 108S only at one side can also be employed. Moreover, the thickness T3 of the transmission suppression member 108 can be configured to differ between the upper portion 108U and the side portions 108S.

The transmission suppression member 108 has the same length as that of the core 104 with respect to the longitudinal direction of the core 104, and suppresses transmission of light between the cores 104 over the entire range in the longitudinal direction of the core 104.

In the example illustrated in FIG. 1, a height H3 of the transmission suppression member 108 is equal to the height H1 of the core 104, or the height H3 is slightly longer than the height H1. Then, an upper end 108T of the transmission suppression member 108 is located at the same position as that of a line LT connecting the upper portions of two cores 104, or is located upper than the line LT. Moreover, lower ends 108B of the transmission suppression member 108 are located at the same position as that of a line LB connecting the lower portions of the two cores 104, or is located lower than the line LB.

The material of the transmission suppression member 108 is not limited as long as being a material which suppresses transmission of light, and, in the present embodiment, the transmission suppression member 108 is made from metal. As the material of the transmission suppression member 108, besides metal, a resin can be used.

Next, actions in the present embodiment are described.

In the waveguide member 102 according to the first embodiment, the clad 106 surrounds the peripheries of the plurality of cores 104, and, in addition, the refractive index of the clad 106 is smaller than the refractive index of the core 104. Light entering via one end in the longitudinal direction of the core 104 is totally reflected when an angle of incidence at the boundary between the core 104 and the clad 106 is larger than a critical angle. This action suppresses leakage of light from within the core 104, so that light advances toward the other end of the core 104.

As mentioned above, in the waveguide member 102 according to the present embodiment, a material having such a refractive index as to totally reflect light inside the core 104 at the boundary between the core 104 and the clad 106 is selected as a material of each of the core 104 and the clad 106. However, light may slightly leak from the core 104.

In the waveguide member 102 according to the present embodiment, the transmission suppression member 108 is arranged between the plurality of cores 104. Even in a case where light has leaked from one of the plurality of cores 104 and the leaking light has advanced toward another core 104, transmission thereof is suppressed by the transmission suppression member, so that the leaking light does not arrive at another core 104. Thus, in the waveguide member 102 according to the present embodiment, in a structure including the plurality of cores 104, even if leaking light occurs from the core 104, light interference or occurrence of noise caused by interference is able to be suppressed.

To suppress such light interference between the plurality of cores 104, a structure which makes an interval between the cores 104 larger is conceivable. However, if the interval between the cores 104 is made larger, it is difficult to arrange the cores 104 at high densities. In the waveguide member 102 according to the present embodiment, even if the plurality of cores 104 is arranged in proximity to each other, light interference between the cores 104 is able to be suppressed. Then, arranging the plurality of cores 104 in proximity to each other enables arranging the cores 104 at high densities as the waveguide member 102.

The clad 106 includes not only the resin-made portion 116 but also the glass-made portion 118. The glass-made portion 118 is higher in bending stiffness than the resin-made portion 116 and is, therefore, capable of stably maintaining the overall shape of the clad 106.

The transmission suppression member 108 is provided at a boundary between the glass-made portion 118 and the resin-made portion 116 of the clad 106, and the glass-made portion 118 supports the transmission suppression member 108, which is in the form of a film or plate. This enables stably maintaining the position and shape of the transmission suppression member 108. Moreover, since the transmission suppression member 108 is able to be formed by, for example, sputtering on a part of the surface of the glass-made portion 118, the transmission suppression member 502 is easy to form.

Each side portion 108S of the transmission suppression member 108 is provided at a side surface of the glass-made portion 118 facing the core 104. This enables arranging a part of the transmission suppression member 108 at a position close to the core 104.

Next, a second embodiment is described. In the second embodiment, for example, elements and members similar to those in the first embodiment are assigned the respective same reference characters as those in the first embodiment, and the detailed description thereof is omitted here.

Figure 2:
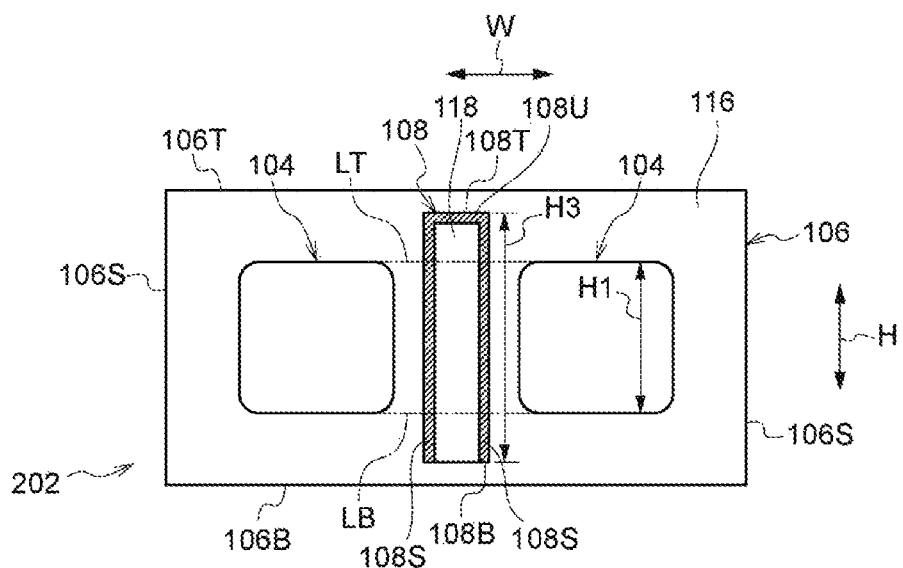
FIG. 2 is a sectional view illustrating, with a cross-section taken along a direction perpendicular to a longitudinal direction of each waveguide, a waveguide member according to a second embodiment.

As illustrated in FIG. 2, in a waveguide member 202 according to the second embodiment, the upper end 108T of the transmission suppression member 108 projects upper than the line LT connecting the upper portions of two cores 104 and reaches a position close to an upper surface 106T of the clad 106. Similarly, the lower ends 108B of the transmission suppression member 108 project lower than the line LB connecting the lower portions of the two cores 104 and reach a position close to a lower surface 106B of the clad 106.

In the waveguide member 202 according to the second embodiment, since the height of the transmission suppression member 108 is large as mentioned above, the transmission suppression member 108 is able to effectively prevent or reduce leaking light coming from one core 104 from arriving at another core 104.

Furthermore, in the waveguide member 202 according to the second embodiment, the upper end 108T of the transmission suppression member 108 does not reach the upper surface 106T of the clad 106, and the lower ends 108B of the transmission suppression member 108 also do not reach the lower surface 106B. This leads to a structure in which the right and left portions of the clad 106 illustrated in FIG. 2 are continuous with each other at a middle portion thereof, so that the strength of the clad 106 at the middle portion thereof is ensured.

Next, a third embodiment is described. In the third embodiment, for example, elements and members similar to those in the first embodiment or the second embodiment are assigned the respective same reference characters as those in the first embodiment or the second embodiment, and the detailed description thereof is omitted here.

Figure 3:
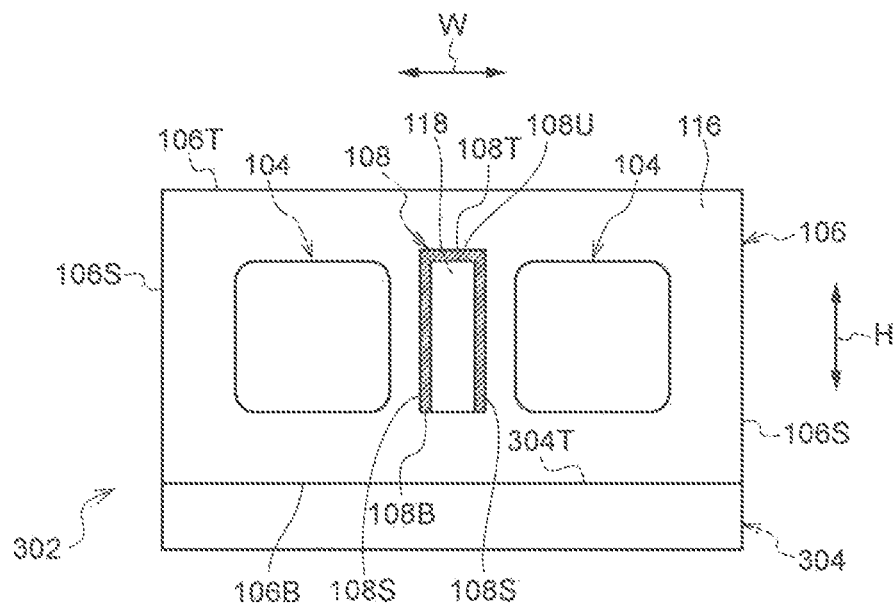
FIG. 3 is a sectional view illustrating, with a cross-section taken along a direction perpendicular to a longitudinal direction of each waveguide, a waveguide member according to a third embodiment.

As illustrated in FIG. 3, a waveguide member 302 according to the third embodiment further includes a supporting substrate 304. In the example illustrated in FIG. 3, the supporting substrate 304 has a contact surface 304T, which is in surface-contact with the entire lower surface 106B of the clad 106. The supporting substrate 304 in the third embodiment is made from glass (in the present embodiment, specifically, alkali-free glass) and is higher in bending stiffness than the clad 106.

In the waveguide member 302 according to the third embodiment, since the supporting substrate 304 is provided to support the clad 106, the clad 106 is able to prevent or reduce inadvertent bending and thus stably maintain the shape of the waveguide member 302.

While the material of the supporting substrate 304 is not limited as long as being capable of supporting the clad 106 to stably maintain the shape of the waveguide member 302, making the supporting substrate 304 from glass enables increasing the stability in shape with respect to the resin-made clad 106 and reliably maintaining the shape of the waveguide member 302. Furthermore, while, in the present embodiment, alkali-free glass is used as the supporting substrate 304, besides this, for example, quartz glass, borosilicate glass, or soda glass can be used.

Furthermore, for example, the supporting substrate 304 can be in contact with the upper surface 106T of the clad 106 or can be in contact with one of two side surfaces 106S. Additionally, the supporting substrate 304 can be in the form of a shape which is in contact with a plurality of surfaces out of the above-mentioned four surfaces of the clad 106.

Next, a fourth embodiment is described. In the fourth embodiment, for example, elements and members similar to those in the first embodiment to the third embodiment are assigned the respective same reference characters as those in the first embodiment to the third embodiment, and the detailed description thereof is omitted here.

Figure 4:
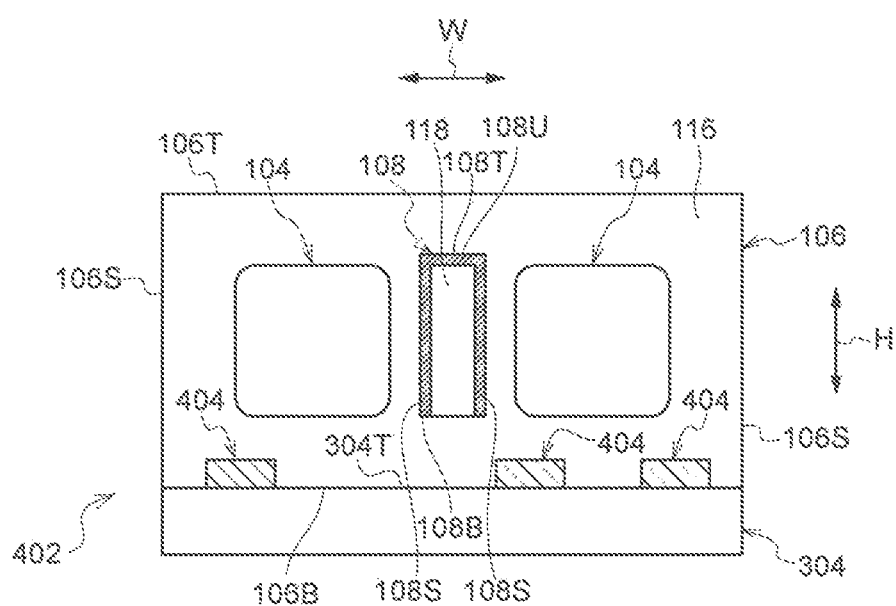
FIG. 4 is a sectional view illustrating, with a cross-section taken along a direction perpendicular to a longitudinal direction of each waveguide, a waveguide member according to a fourth embodiment.

As illustrated in FIG. 4, in a waveguide member 402 according to the fourth embodiment, electrical wiring 404 is provided at the contact surface 304T of the supporting substrate 304, i.e., a surface on which the clad 106 is located. The electrical wiring 404 is wiring having a predetermined pattern formed on the contact surface 304T from, for example, conductive metal such as copper, in which electricity flows. As the material of the electrical wiring 404, besides copper, for example, aluminum, nickel, tin, silver, gold, iron, or bismuth can be used as metal. These metals can be singularly used or can be used in combination as a plurality of types of metals.

The waveguide member 402 according to the fourth embodiment includes the electrical wiring 404 as mentioned above, and is, therefore, able to not only guide light via the cores 104 but also transmit an electrical signal or supply electric power to another member (configure a part of a power feeding circuit).

In addition, since the electrical wiring 404 is provided at a surface (contact surface 304T) of the supporting substrate 304 on which the clad 106 is located, the electrical wiring 404 is covered with the clad 106. This enables protecting the electrical wiring 404 and preventing or reducing deterioration of the electrical wiring 404.

Next, a fifth embodiment is described. In the fifth embodiment, for example, elements and members similar to those in the first embodiment to the fourth embodiment are assigned the respective same reference characters as those in the first embodiment to the fourth embodiment, and the detailed description thereof is omitted here.

Figure 5:
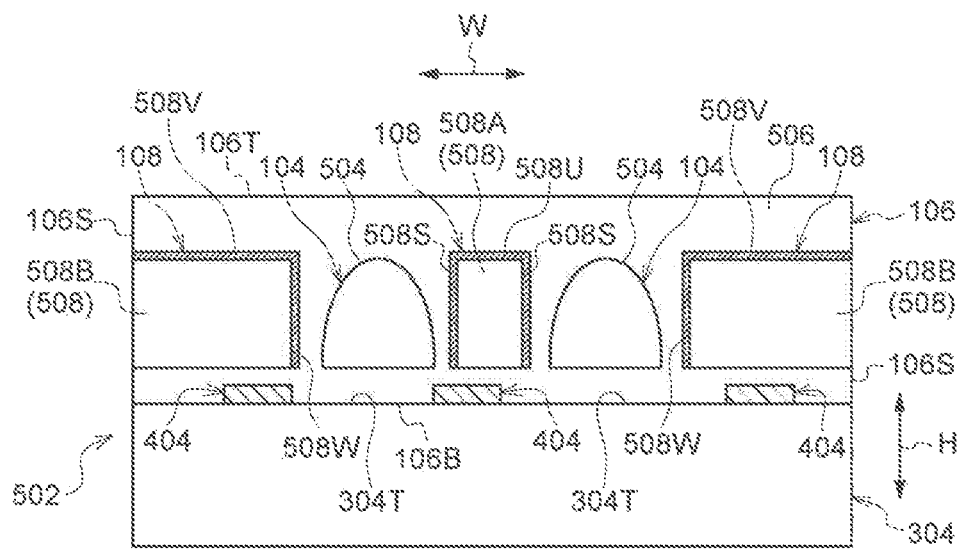
FIG. 5 is a sectional view illustrating, with a cross-section taken along a direction perpendicular to a longitudinal direction of each waveguide, a waveguide member according to a fifth embodiment.

As illustrated in FIG. 5, in a waveguide member 502 according to the fifth embodiment, in each core 104, a portion thereof located at a side opposite to the supporting substrate 304 is a curved portion 504, which is curved in a convex manner toward the upper surface 106T of the clad 106.

In the waveguide member 502 according to the fifth embodiment, as with the first embodiment, the clad 106 includes a resin-made portion 506 made from a resin and a glass-made portion 508 made from glass. In the example illustrated in FIG. 5, a glass-made portion 508A, the cross-section shape of which is a rectangle shape, is provided between two cores 104. Additionally, a glass-made portion 508B is also provided closer to each of the end portion sides in the width direction (the direction of arrow W) than the two cores 104.

Around the core 104, the resin-made portion 506 of the clad 106 surrounds the core 104. This attains a state in which, at a boundary between the core 104 and the clad 106, the angle of incidence of light entering via the core 104 is larger than a critical angle.

In the waveguide member 502 according to the fifth embodiment, as with the first embodiment, the transmission suppression member 108 is provided at a boundary between the glass-made portion 508 and the resin-made portion 506 in the clad 106. Specifically, in the glass-made portion 508A, the transmission suppression member 108 is provided at an upper portion 508U, which is located on a side close to the upper surface 106T of the clad 106, and two side portions 508S, each of which is located on a side close to the core 104. In the glass-made portion 508B, the transmission suppression member 108 is provided at an upper portion 508V and side portions 508W, each of which is located on a side close to the core 104.

In the waveguide member 502 according to the fifth embodiment, as mentioned above, the clad 106 includes not only the resin-made portion 506 but also the glass-made portion 508. The glass-made portion 508 is higher in bending stiffness than the resin-made portion 506 and is, therefore, capable of stably maintaining the overall shape of the clad 106.

In addition, the transmission suppression member 108 is provided at a boundary between the glass-made portion 508 and the resin-made portion 506 of the clad 106, and the glass-made portion 508 supports the transmission suppression member 108, which is in the form of a film or plate. This enables stably maintaining the position and shape of the transmission suppression member 108. Moreover, as described below, since the transmission suppression member 508 is able to be formed by, for example, sputtering on a part of the surface of the glass-made portion 508, the transmission suppression member 508 is easy to form.

In addition, the transmission suppression member 108 is provided at a side surface of the glass-made portion 508 facing the core 104. The side surface of the glass-made portion 508 facing the core 104 is at a position close to the core 104. This enables arranging the transmission suppression member 108 at a position close to the core 104.

Moreover, in the waveguide member 502 according to the fifth embodiment, the curved portion 504 is provided as a part of the core 104. In the curved portion 504, the core 104 is curved in a convex manner toward the upper surface 106T of the clad 106, i.e., from the center toward the outside. Accordingly, it is easy to attain a state in which the angle of incidence of light inside the core 104 falling on a boundary between the core 104 and the clad 106 has exceeded a critical angle, i.e., a state in which the light is totally reflected. However, even when the cross-section shape of the core 104 is a shape which does not include such a curved portion 504, i.e., the cross-section shape of the core 104 is a square shape or rectangular shape, as in the first embodiment, it only needs to be possible to attain a state in which light inside the core 104 is totally reflected at a boundary between the core 104 and the clad 106.

The curved portion 504 of the core 104 is located on a side opposite to the electrical wiring 404. While, since neither the electrical wiring 404 nor the supporting substrate 304 is provided on a side opposite to the electrical wiring 404, leaking light is likely to further leak to the outside of the waveguide member 502, the curved portion 504 contributes to a structure which has a high effect of preventing or reducing leaking light to the side opposite to the electrical wiring 404.

Next, a sixth embodiment is described. In the sixth embodiment, for example, elements and members similar to those in the first embodiment to the fifth embodiment are assigned the respective same reference characters as those in the first embodiment to the fifth embodiment, and the detailed description thereof is omitted here.

Figure 6:
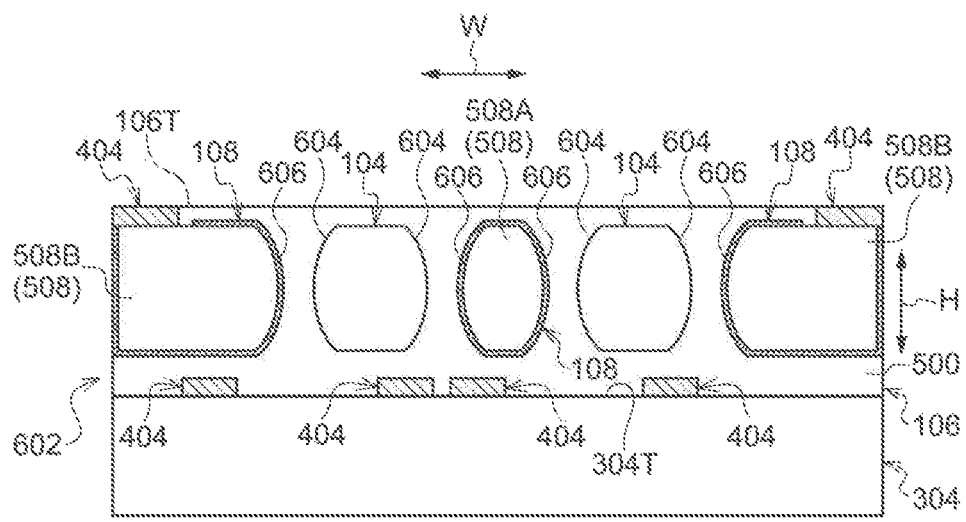
FIG. 6 is a sectional view illustrating, with a cross-section taken along a direction perpendicular to a longitudinal direction of each waveguide, a waveguide member according to a sixth embodiment.

As illustrated in FIG. 6, in a waveguide member 602 according to the sixth embodiment, the electrical wiring 404 is also provided at the upper surface 106T of the clad 106.

Moreover, in the waveguide member 602 according to the sixth embodiment, each side surface of the core 104 is a curved portion 604, which is curved in a convex manner toward the width direction. Then, a side surface in the glass-made portion 508 is also a curved portion 606, which is curved in a convex manner toward the width direction. Then, in the glass-made portion 508 of the clad 106, the transmission suppression member 108 is provided over the entire circumference in a range avoiding the electrical wiring 404 as viewed in the cross-section illustrated in FIG. 6. While the transmission suppression member 108 and the electrical wiring 404 can be continuous with each other, it is favorable that they are not in contact with each other.

In the waveguide member 602 according to the sixth embodiment, as mentioned above, the electrical wiring 404 is also provided at the upper surface 106T of the clad 106, so that a structure which includes more electrical wirings 404 than the waveguide member 402 in the fourth embodiment is employed.

Moreover, the curved portion 606 of the core 104 makes it easy to attain a state in which the angle of incidence of light inside the core 104 falling on the boundary between the core 104 and the clad 106 has exceeded a critical angle, i.e., a state in which the light is totally reflected.

Moreover, since the transmission suppression member 108 is provided over the entire circumference of the glass-made portion 508, it is possible to attain a structure in which, when a plurality of waveguide members 602 is arranged side by side in the lateral direction, the transmission suppression member 108 is reliably located between the cores 104 of adjacent waveguide members 602. This enables preventing or reducing interference of leaking light between the cores 104 of adjacent waveguide members 602 even when a plurality of waveguide members 602 is arranged side by side in the lateral direction.

Next, a seventh embodiment is described. In the seventh embodiment, for example, elements and members similar to those in the first embodiment to the sixth embodiment are assigned the respective same reference characters as those in the first embodiment to the sixth embodiment, and the detailed description thereof is omitted here.

Figure 7:
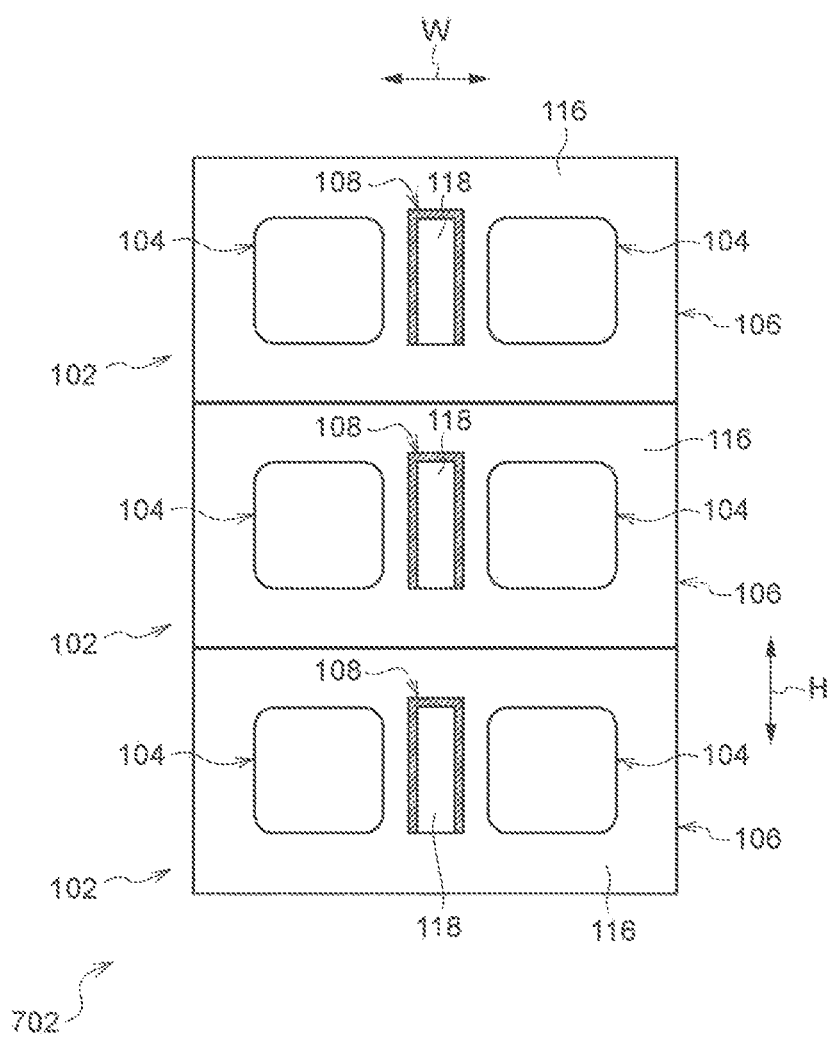
FIG. 7 is a sectional view illustrating, with a cross-section taken along a direction perpendicular to a longitudinal direction of each waveguide, a waveguide layered product according to a seventh embodiment.

In the seventh embodiment, as illustrated in FIG. 7, a waveguide layered product 702 is provided. In an example of the waveguide layered product 702 illustrated in FIG. 7, a plurality of (in FIG. 7, three) waveguide members 102, each of which is illustrated in the first embodiment, is stacked in layers in the height direction (the direction of arrow H).

In the waveguide layered product 702 according to the seventh embodiment, each waveguide member 102 includes the transmission suppression member 108. Accordingly, in each waveguide member 102, light interference caused by leakage of light between the cores 104 is able to be suppressed and the arrangement of the cores 104 at high densities is also able to be performed. Then, in the waveguide layered product 702, in which the plurality of waveguide members 102 is stacked in layers, it is possible to attain a structure which includes many more cores 104 (waveguides) without becoming larger in size in the lateral direction (the direction of arrow W1).

Next, an eighth embodiment is described. In the eighth embodiment, for example, elements and members similar to those in the first embodiment to the seventh embodiment are assigned the respective same reference characters as those in the first embodiment to the seventh embodiment, and the detailed description thereof is omitted here.

Figure 8:
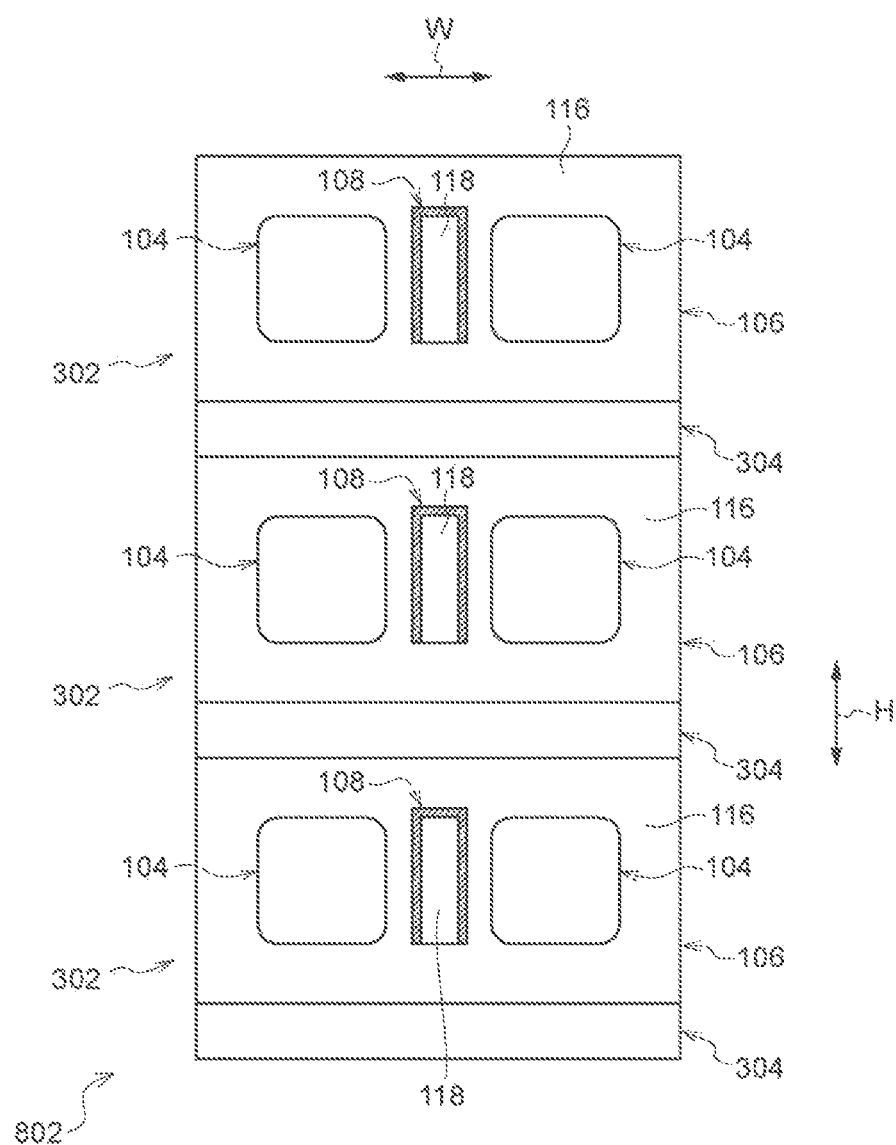
FIG. 8 is a sectional view illustrating, with a cross-section taken along a direction perpendicular to a longitudinal direction of each waveguide, a waveguide layered product according to an eighth embodiment.

As illustrated in FIG. 8, a waveguide layered product 802 according to the eighth embodiment has a structure in which the waveguide members 302, each of which is illustrated in the third embodiment, are stacked in layers. Since each waveguide member 302 includes the supporting substrate 304 and the shape thereof is stably maintained, the shape of the waveguide layered product 802 is also stably maintained.

As mentioned above, in a waveguide layered product, waveguide members to be stacked in layers are not limited to the waveguide member 102 in the first embodiment, and the waveguide members in each of the second to sixth embodiments can be stacked in layers to form a waveguide layered product.

Next, a ninth embodiment is described. In the ninth embodiment, for example, elements and members similar to those in the first embodiment to the eighth embodiment are assigned the respective same reference characters as those in the first embodiment to the eighth embodiment, and the detailed description thereof is omitted here.

Figure 9:
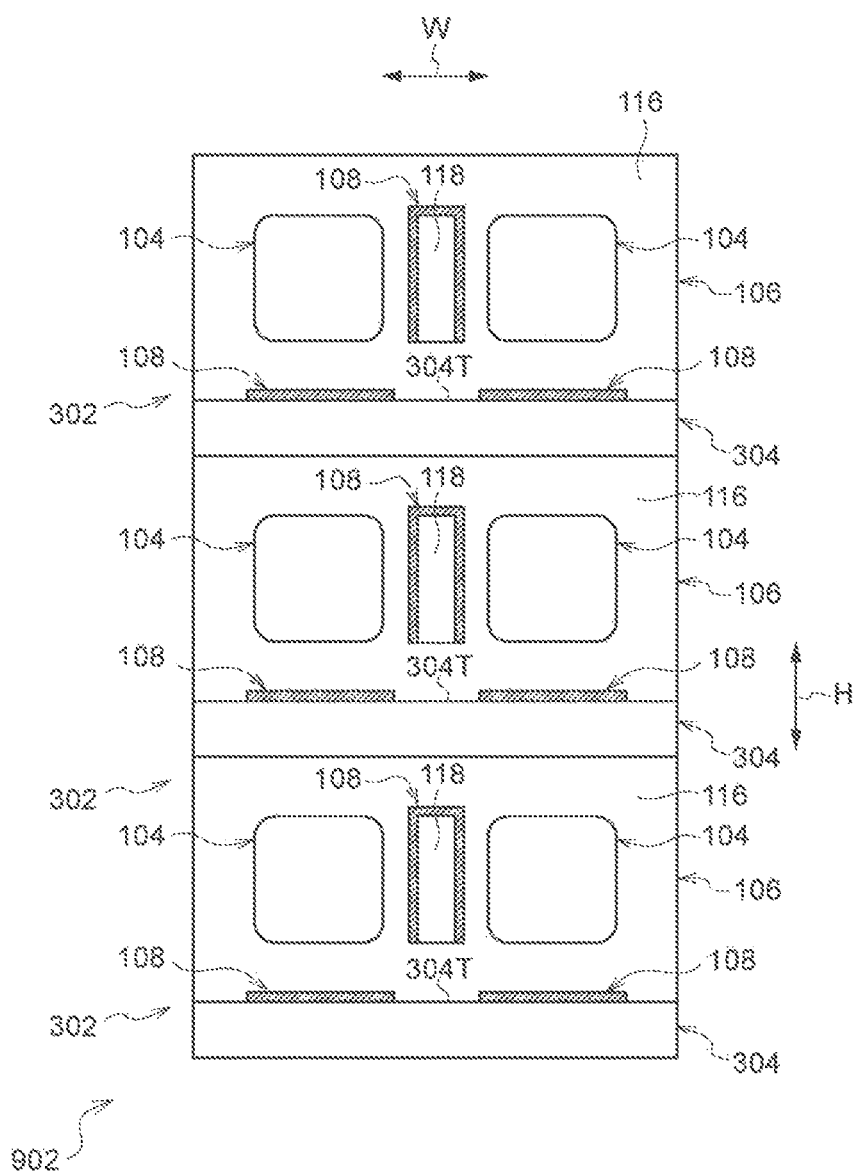
FIG. 9 is a sectional view illustrating, with a cross-section taken along a direction perpendicular to a longitudinal direction of each waveguide, a waveguide layered product according to a ninth embodiment.

In a waveguide layered product 902 according to the ninth embodiment, as illustrated in FIG. 9, a structure of each of the waveguide members 302 to be stacked in layers is different as compared with that in the waveguide layered product 802 (see FIG. 8) in the eighth embodiment. Specifically, in the ninth embodiment, in each of the waveguide members 302, the transmission suppression member 108 is also provided at a position between the core 104 and the supporting substrate 304. In the example illustrated in FIG. 9, the transmission suppression member 108 is provided at the contact surface 304T of the supporting substrate 304.

In the waveguide layered product 902 according to the ninth embodiment, even between the stacked waveguide members 302 (stacked waveguide members 302 located one above the other in FIG. 9), the transmission suppression member 108 is located between the cores 104. Therefore, even if leaking light occurs in the cores 104 located one above the other, light interference is able to be prevented or reduced.

While the method of manufacturing the waveguide member and the waveguide layered product in each of the above-described embodiments is not specifically limited, for example, the waveguide member 502 in the fifth embodiment can be manufactured by the following method.

Figure 10A:
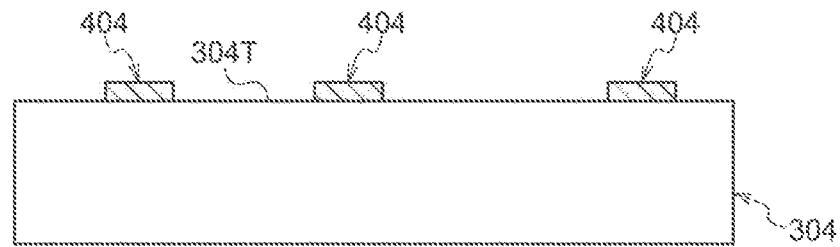
FIG. 10A is a sectional view illustrating a state of a middle way in which the waveguide member according to the fifth embodiment is being manufactured.

First, as illustrated in FIG. 10A, the method prepares the glass-made supporting substrate 304 with the electrical wiring 404 formed on one surface (the contact surface 304T) thereof.

Figure 10B:
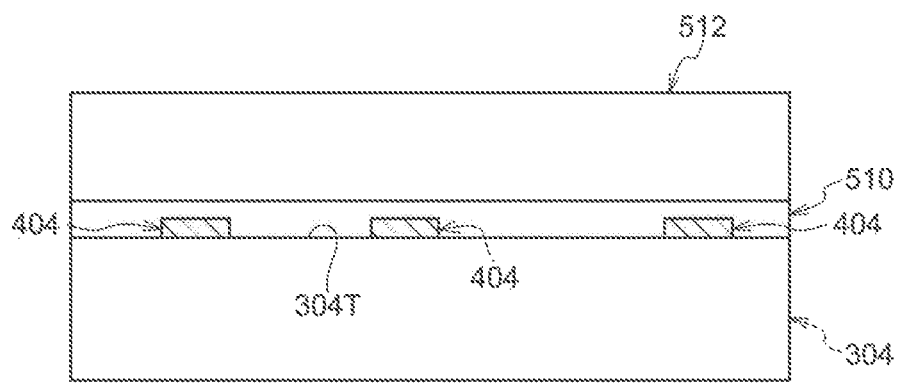
FIG. 10B is a sectional view illustrating a state of a middle way in which the waveguide member according to the fifth embodiment is being manufactured.

Then, as illustrated in FIG. 10B, the method laminates the contact surface 304T of the supporting substrate 304 with a resin layer 510 in such a way as to cover the electrical wiring 404, and further stacks a glass layer 512 on the resin layer 510. The height of the glass layer 512 is equal to the height of each of the core 104 and the glass-made portion 508.

Figure 10C:
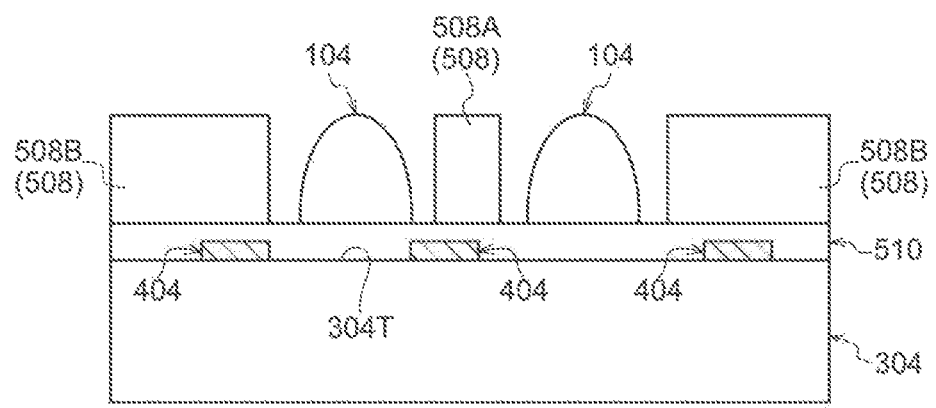
FIG. 10C is a sectional view illustrating a state of a middle way in which the waveguide member according to the fifth embodiment is being manufactured.

Next, as illustrated in FIG. 10C, the method removes an unnecessary portion by performing, for example, etching on the glass layer 512, and thus forms the cores 104 and the glass-made portions 508. As the etching, for example, wet etching using an alkaline solution or dry etching under an etching gas environment can be used. Moreover, an unnecessary portion can be removed by, instead of etching, for example, laser irradiation or sandblasting.

Figure 10D:
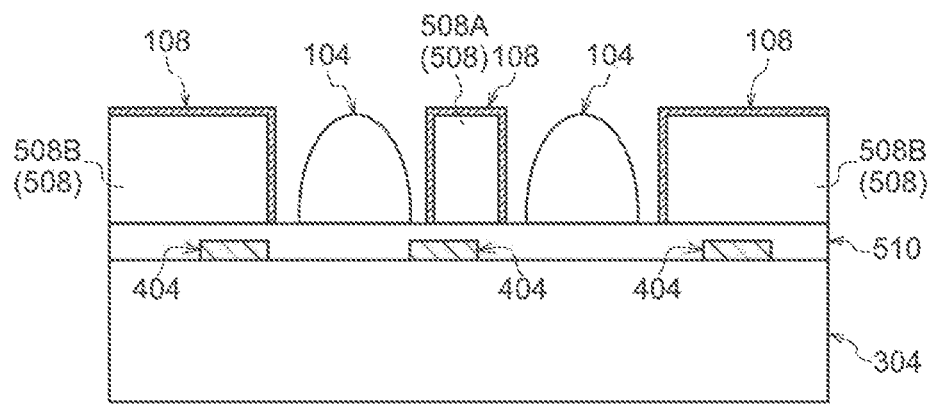
FIG. 10D is a sectional view illustrating a state of a middle way in which the waveguide member according to the fifth embodiment is being manufactured.

After that, as illustrated in FIG. 10D, the method forms the transmission suppression member 108 in a film shape by, for example, sputtering on exposed surfaces (surfaces which are not in contact with the resin layer 510) in the glass-made portions 508.

Figure 10E:
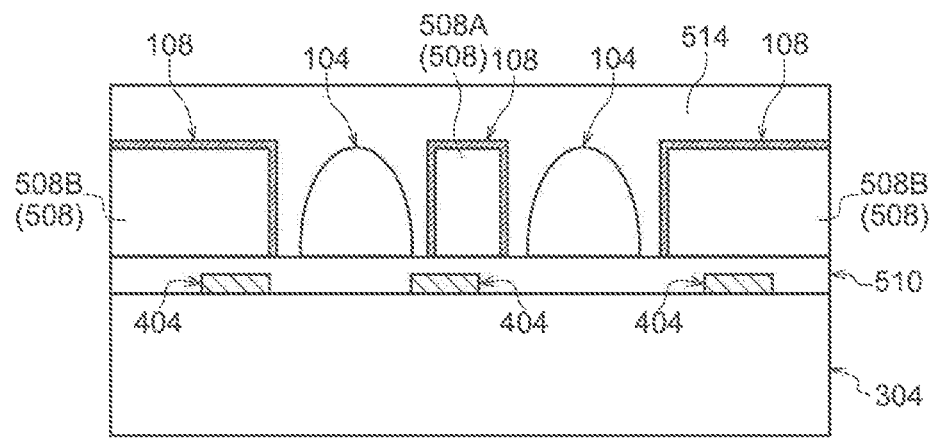
FIG. 10E is a sectional view illustrating a state of a middle way in which the waveguide member according to the fifth embodiment is being manufactured.

After that, as illustrated in FIG. 10E, the method fills a portion around the cores 104 and the glass-made portions 508 with a resin material 514 and then performs lamination. As illustrated in FIG. 5, the resin layer 510 and the resin material 514 are integrated together to form the clad 106, so that the waveguide member 502 in the fifth embodiment is obtained as a whole.

Moreover, for example, the waveguide member 602 in the sixth embodiment can be manufactured by the following method.

Figure 11A:
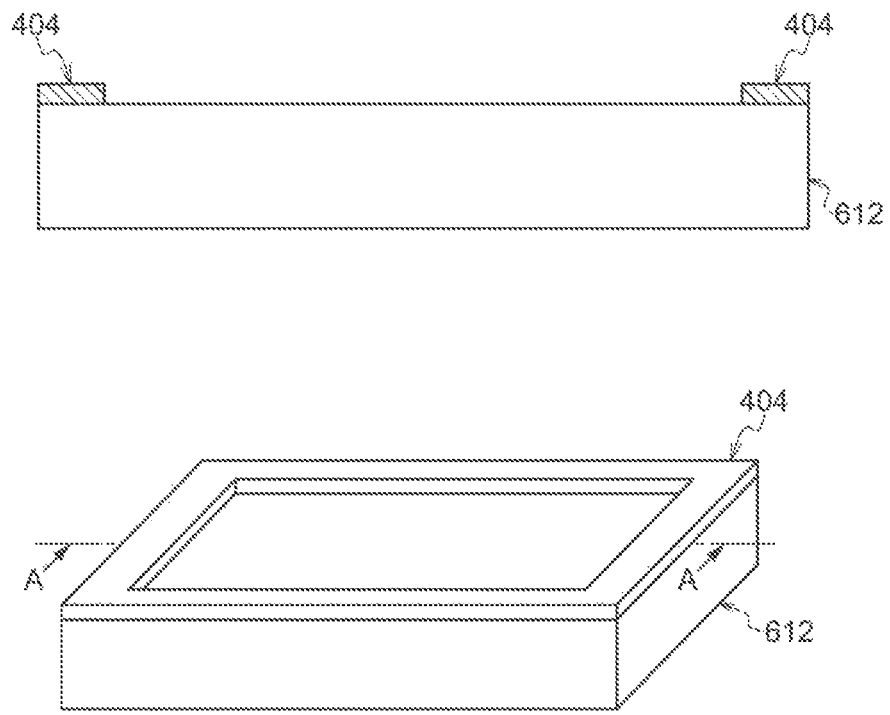
FIG. 11A is a sectional view and a perspective view each illustrating a state of a middle way in which the waveguide member according to the sixth embodiment is being manufactured.

First, as illustrated in FIG. 11A, the method prepares a glass material 612 with the electrical wiring 404 formed thereon.

Figure 11B:
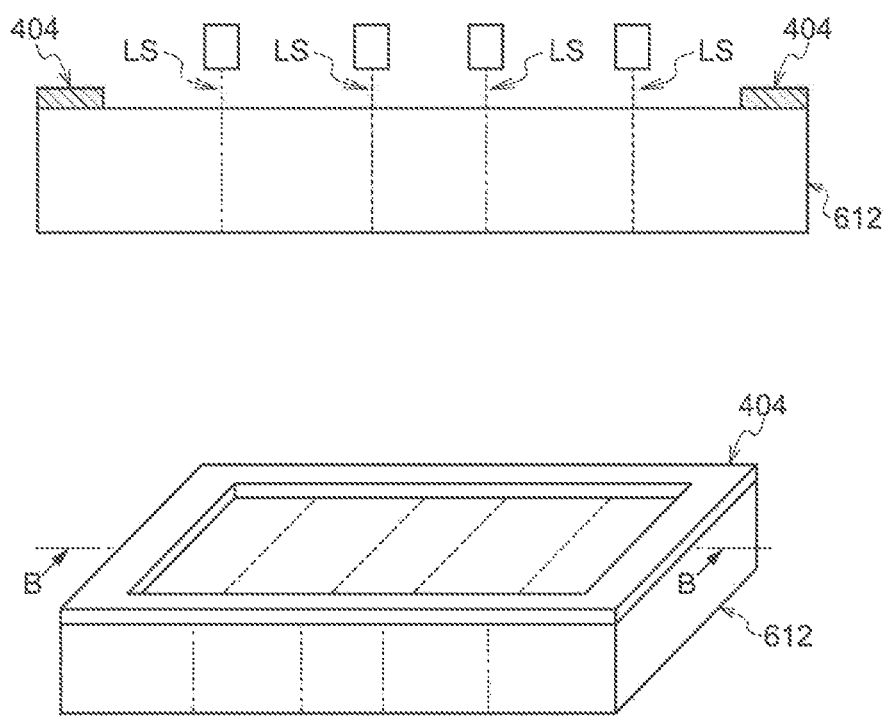
FIG. 11B is a sectional view and a perspective view each illustrating a state of a middle way in which the waveguide member according to the sixth embodiment is being manufactured.

Then, as illustrated in FIG. 11B, the method performs irradiation with laser LS on predetermined positions on the glass material 612. The predetermined positions are positions at which to form the resin-made portion 506 in the clad 106, i.e., positions at which to remove the glass material 612 in a post-process. While, in FIG. 11B, a state in which the laser LS is radiated from the upper side is illustrated, the laser LS can be radiated from the lower side. Thus, adjusting the intensity or the irradiation range of the laser LS enables optionally setting portions which are made to remain without being removed during etching.

Figure 11C:
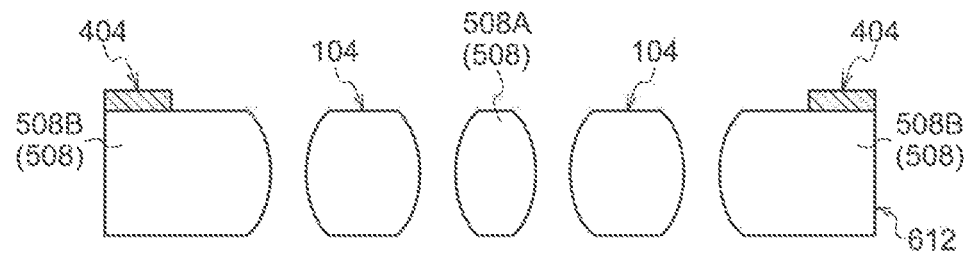
FIG. 11C is a sectional view and a perspective view each illustrating a state of a middle way in which the waveguide member according to the sixth embodiment is being manufactured.
Figure 11C:
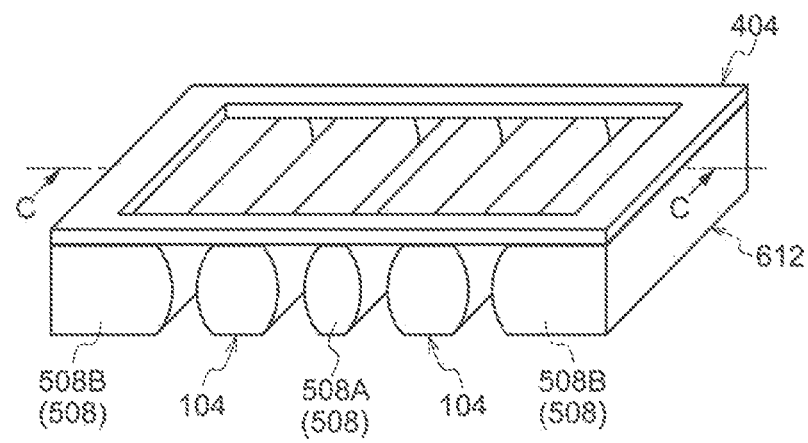

After that, as illustrated in FIG. 11C, the method performs, for example, etching to partially remove the glass material 612 at laser irradiation positions, thus forming the cores 104 and the glass-made portions 508.

Figure 11D:
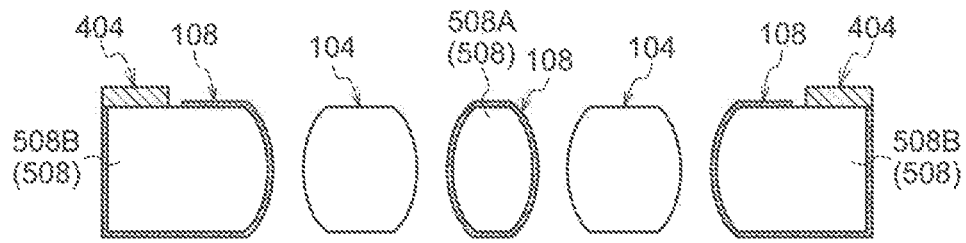
FIG. 11D is a sectional view illustrating a state of a middle way in which the waveguide member according to the sixth embodiment is being manufactured.

Next, as illustrated in FIG. 11D, the method forms the transmission suppression member 108 with a metallic film on the glass-made portion 508.

Figure 11E:
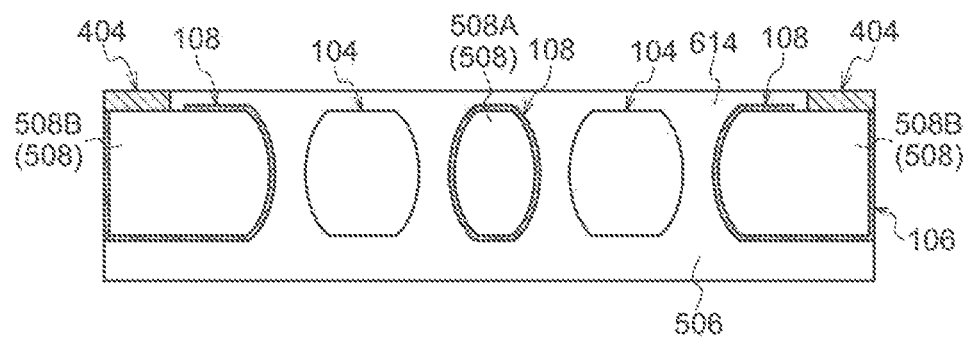
FIG. 11E is a sectional view illustrating a state of a middle way in which the waveguide member according to the sixth embodiment is being manufactured.

After that, as illustrated in FIG. 11E, the method fills a range which becomes the resin-made portion 506 with a resin material 614, thus configuring a structure in which the clad 106 including the resin-made portion 506 and the glass-made portion 508 surrounds the core 104.

Figure 11F:
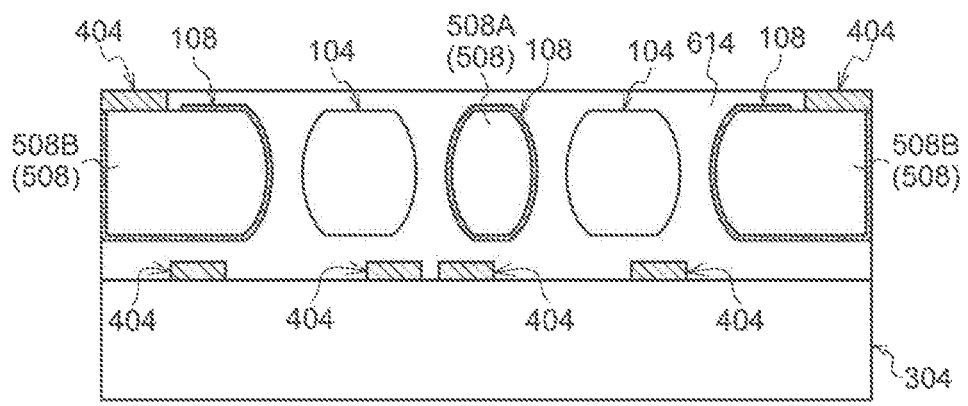
FIG. 11F is a sectional view illustrating a state of a middle way in which the waveguide member according to the sixth embodiment is being manufactured.

After that, the method stacks a structure obtained by the above-mentioned process on the glass-made supporting substrate 304 with the electrical wiring 404 formed thereon, as illustrated in FIG. 11F. Upon the supporting substrate 304 being joined to the resin material 614, as illustrated in FIG. 6, the waveguide member 602 in the sixth embodiment is obtained as a whole.

Furthermore, the waveguide members 102, 202, 302, and 402 in the first embodiment to the fourth embodiment can be manufactured by the manufacturing methods similar to those for the waveguide member 502 in the fifth embodiment and the waveguide member 602 in the sixth embodiment. However, in a case where, depending on differences in structure or shape, there are, for example, unnecessary processing operations in the manufacturing methods for the waveguide members 102, 202, 302, and 402 in the first embodiment to the fourth embodiment, such unnecessary processing operations can be omitted as appropriate.

In each of the above-described embodiments, the transmission suppression member 108 is made from metal. While, as a material of the transmission suppression member, as long as being capable of preventing or reducing transmission of light, a material other than metal, such as a resin, is not excluded, making the transmission suppression member from metal enables reliably attaining a structure which does not allow light to be transmitted therethrough.

In each of the above-described third to sixth, eighth, and ninth embodiments, the plurality of cores 104 is arranged side by side along the contact surface 304T. Thus, it is possible to attain a structure in which the supporting substrate 304 supports the clad 106 along the direction of side-by-side arrangement of the cores 104.

In each of the above-described embodiments, the core 104 is made from glass. As long as the core 104 is a member which allows light to be transmitted therethrough and has a refractive index larger than the refractive index of the clad 106, such a member is able to totally reflect light at a boundary between the core 104 and the clad 106. Accordingly, while a resin is not excluded as a material of the core 104, a glass-made core is smaller in light transmission loss as compared with a resin-made core and, moreover, is excellent in resistance to high temperatures in the state of being mounted in, for example, an electronic apparatus as an actual usage environment.

Furthermore, suppression of light transmission by the transmission suppression member includes both suppression using absorption of light and suppression using reflection of light, so that, actually, light transmission is prevented or reduced by actions of these both suppressions.

In each of the above-described embodiments, the whole or a part of the clad 106 is made from a resin. Since a resin-made portion is included in at least a part of the clad 106 in this way, the clad 106 is easy to form and has a high degree of freedom of shape.

While embodiments of the technique which the present application discloses have been described above, the technique which the present application discloses is not limited to the above description, and, naturally, besides the above description, the technique can also be implemented in various modifications within a range not departing from the gist thereof.

The present specification further discloses the following supplementary notes with regard to the above-described embodiments.

(Supplementary Note 1)

A waveguide member including:
a plurality of cores each configured to allow light to be transmitted therethrough;
a clad surrounding the plurality of cores and smaller in refractive index for light than each of the cores; and
a transmission suppression member located between mutually adjacent two cores out of the plurality of cores in the clad and configured to suppress transmission of light leaking from each of the cores.

(Supplementary Note 2)

The waveguide member according to supplementary note 1, further including a supporting substrate configured to support the clad.

(Supplementary Note 3)

The waveguide member according to supplementary note 2, wherein the supporting substrate is made from glass.

(Supplementary Note 4)

The waveguide member according to supplementary note 2 or supplementary note 3, further including electrical wiring at a surface of the supporting substrate where the clad is located.

(Supplementary Note 5)

The waveguide member according to supplementary note 4, wherein a curved portion which is curved in a convex manner outward in a cross-section perpendicular to a longitudinal direction of the core is provided at the core.

(Supplementary Note 6)

The waveguide member according to supplementary note 5, wherein the curved portion is located on a side opposite to the electrical wiring.

(Supplementary Note 7)

The waveguide member according to any one of supplementary note 2 to supplementary note 6, wherein the plurality of cores is arranged side by side along a contact surface of the supporting substrate which is in contact with the clad.

(Supplementary Note 8)

The waveguide member according to any one of supplementary note 1 to supplementary note 7, wherein the clad includes a glass-made portion and a resin-made portion, and wherein the transmission suppression member is provided at a boundary between the glass-made portion and the resin-made portion.

(Supplementary Note 9)

The waveguide member according to supplementary note 8, wherein the transmission suppression member is provided at a side surface of the glass-made portion facing the core.

(Supplementary Note 10)

The waveguide member according to any one of supplementary note 1 to supplementary note 9, wherein the transmission suppression member is made from metal.

(Supplementary Note 11)

The waveguide member according to any one of supplementary note 1 to supplementary note 10, wherein the core is made from glass.

(Supplementary Note 12)

The waveguide member according to any one of supplementary note 1 to supplementary note 11, wherein a part or whole of the clad is made from a resin.

(Supplementary Note 13)

A waveguide layered product including a plurality of waveguide members stacked in layers, each of the plurality of waveguide members including a plurality of cores each configured to allow light to be transmitted therethrough, a clad surrounding the plurality of cores and smaller in refractive index for light than each of the cores, and a transmission suppression member located between mutually adjacent two cores out of the plurality of cores in the clad and configured to suppress transmission of light leaking from each of the cores.

(Supplementary Note 14)

The waveguide layered product according to supplementary note 13, wherein each of the plurality of waveguide members includes a supporting substrate configured to support the clad, and the plurality of waveguide members is stacked in layers in a direction normal to the supporting substrate.

What is claimed is:

1. A waveguide member comprising:

a plurality of cores each configured to allow light to be transmitted therethrough;

a clad surrounding the plurality of cores and smaller in refractive index for light than each of the cores; and a transmission suppression member located between mutually adjacent two cores out of the plurality of cores in the clad without contact with the cores and configured to suppress transmission of light leaking from each of the cores, wherein the clad includes a resin-made portion and a glass-made portion higher in bending stiffness than the resin-made portion, wherein the transmission suppression member is in a form of a film or plate and is provided at a boundary between at least a side surface of the glass-made portion facing one of the adjacent two cores and the resin-made portion, and wherein the glass-made portion is configured to support the transmission suppression member and to maintain an overall shape of the clad.

2. The waveguide member according to claim 1, further comprising a supporting substrate configured to support the clad.

3. A waveguide layered product comprising a plurality of waveguide members stacked in layers, each of the plurality of waveguide members including a plurality of cores each configured to allow light to be transmitted therethrough, a clad surrounding the plurality of cores and smaller in refractive index for light than each of the cores, and a transmission suppression member located between mutually adjacent two cores out of the plurality of cores in the clad without contact with the cores and configured to suppress transmission of light leaking from each of the cores, wherein the clad includes a resin-made portion and a glass-made portion higher in bending stiffness than the resin-made portion, wherein the transmission suppression member is in a form of a film or plate and is provided at a boundary between at least a side surface of the glass-made portion facing one of the adjacent two cores and the resin-made portion, and wherein the glass-made portion is configured to support the transmission suppression member and to maintain an overall shape of the clad.

\* \* \* \* \*